US012331563B2

(12) United States Patent
Ford

(10) Patent No.: US 12,331,563 B2
(45) Date of Patent: Jun. 17, 2025

(54) HOOD PIN WITH INTERRUPTER SWITCH

(71) Applicant: Lokar, Inc., Knoxville, TN (US)

(72) Inventor: Kevin Steven Ford, Knoxville, TN (US)

(73) Assignee: Lokar, Inc.

( * ) Notice: Subject to any disclaimer, the term of this patent is extended or adjusted under 35 U.S.C. 154(b) by 0 days.

(21) Appl. No.: 17/903,406

(22) Filed: Sep. 6, 2022

(65) Prior Publication Data

US 2022/0412131 A1 Dec. 29, 2022

Related U.S. Application Data

(62) Division of application No. 16/155,942, filed on Oct. 10, 2018, now Pat. No. 11,434,671.

(60) Provisional application No. 62/573,508, filed on Oct. 17, 2017.

(51) Int. Cl.

| | |
|---|---|
| ***E05B 83/24*** | (2014.01) |
| ***E05B 17/10*** | (2006.01) |
| ***E05B 41/00*** | (2006.01) |
| ***E05B 81/66*** | (2014.01) |
| ***E05C 19/12*** | (2006.01) |

(52) U.S. Cl.

CPC .............. *E05B 83/24* (2013.01); *E05B 17/10* (2013.01); *E05B 41/00* (2013.01); *E05B 81/66* (2013.01); *E05B 83/243* (2013.01); *E05C 19/12* (2013.01); *E05Y 2900/536* (2013.01)

(58) Field of Classification Search

CPC .......... E05B 81/64; E05B 81/70; E05B 81/72; E05B 85/22; E05B 2063/0026; E05B 2015/0235; E05B 63/0052; E05B 83/24; E05B 41/00; B62D 25/10; B62D 25/105; B62D 25/12

See application file for complete search history.

(56) References Cited

U.S. PATENT DOCUMENTS

| | | | | |
|---|---|---|---|---|
| 3,633,390 A | 1/1972 | Wartian | | |
| 7,766,410 B2 * | 8/2010 | Tseng | B60K 15/05 296/97.22 | |
| 8,231,149 B1 | 7/2012 | Shelby | | |
| 10,059,305 B2 * | 8/2018 | Imamura | B60R 25/241 | |
| 10,662,676 B1 | 5/2020 | Monroe | | |
| 2009/0288897 A1 | 11/2009 | Louramore | | |

(Continued)

FOREIGN PATENT DOCUMENTS

| | | | |
|---|---|---|---|
| DE | 202014103252 U1 * | 11/2015 | E05B 63/121 |
| EP | 3130730 A1 * | 2/2017 | E05B 15/004 |

(Continued)

*Primary Examiner* — Kristina R Fulton
*Assistant Examiner* — Noah Horowitz
(74) *Attorney, Agent, or Firm* — Blanchard Horton PLLC

(57) ABSTRACT

A vehicle hood pin apparatus is disclosed which contains an outer housing with holes to accept a cotter pin or other self-locking device, an inner pin with holes that can mate with the holes on the outer housing, and an electric switch attached to the housing to communicate signals to the vehicle, and in mechanical connection with the inner pin. By mating the holes in the inner pin with the holes in the outer housing and inserting the cotter pin or other self-locking device into the mated holes, the hood is closed securely on the vehicle and the electric switch sends a signal to the vehicle.

7 Claims, 5 Drawing Sheets

(56) References Cited

U.S. PATENT DOCUMENTS

2015/0345186 A1* 12/2015 Park ........................ E05B 85/26
292/194
2016/0340040 A1* 11/2016 Pfeiffer ................... E05C 19/16
2018/0298636 A1* 10/2018 Minnich ................. E05B 77/34
2018/0298651 A1* 10/2018 Cencer .................... E05B 79/04
2019/0112844 A1 4/2019 Ford
2019/0225141 A1* 7/2019 DeLong ............... B60Q 1/2661
2019/0249470 A1* 8/2019 Sturm ..................... E05B 81/66

FOREIGN PATENT DOCUMENTS

JP 2002206363 A 1/2007
WO WO-2018050150 A1 * 3/2018 ............. E05B 81/70

* cited by examiner

HOOD PIN WITH INTERRUPTER SWITCH

CROSS-REFERENCE TO RELATED APPLICATIONS

This application is a divisional of U.S. patent application Ser. No. 16/155,942, filed on Oct. 10, 2018, which claims the benefit of U.S. Provisional Patent Application No. 62/573,508, filed on Oct. 17, 2017, each of which is incorporated in its entirety herein.

STATEMENT REGARDING FEDERALLY-SPONSORED RESEARCH OR DEVELOPMENT

Not Applicable

BACKGROUND OF THE INVENTION

1. Field of Invention

The present general inventive concept relates to a hood pin for securing an automobile hood and more specifically for a hood pin which includes an interrupter switch or other signal switch for indicating a condition of the hood pin.

2. Description of the Related Art

Hood pins for securing vehicle hoods where the conventional latch system is either insufficient or not provided are known in the art. Numerous types of hood pins have been utilized, for example, on racing vehicles where the high speed of the vehicle can produce a substantial amount of lift forces on the hood, causing the hood to lift upward while the vehicle is in operation. Additionally, some aftermarket hoods, such as hoods designed for use with certain types of classic vehicles, street racing vehicles, and other types of vehicles, utilize hood pins rather than, or in addition to, conventional latch systems, for example to achieve a desired aesthetic and/or to provide additional security against lifting of the hood during operation.

While hood pins can be effective for securing a vehicle hood during operation of the vehicle, a problem arises in that, in certain circumstances, it is possible to inadvertently begin operating a vehicle without having the hood pin properly secured. This could occur, for example, at a car show, where multiple people may be opening and closing the hood to inspect the engine compartment and may close the hood without completely securing it by means of the hood pins. The driver or operator of the vehicle may assume the hood is secured because the hood is closed, without ascertaining whether the hood pins have been secured. In such circumstances, during subsequent operation of the vehicle, aerodynamic lift applied to the vehicle hood may result in the hood lifting upward, thereby obscuring visibility of the vehicle operator and creating an unsafe condition. Thus, it would be beneficial to have means available to indicate a condition of the hood pin, such as for example a condition in which the hood pin was not in properly secured to secure the hood against lift. In light of the above, there is a need for a hood pin which includes either a switch for producing a signal to alert a user of an “unlatched” condition of the hood pin, or an interrupter switch which serves to prevent the vehicle from operating prior to securing the hood.

BRIEF SUMMARY OF THE INVENTION

The present general inventive concept, in various example embodiments, provides a pin or other member, at least indirectly attached to the vehicle hood, which moves under pressure by an operator, at least one electric switch, at least indirectly attached to the vehicle, to communicate signals to the vehicle, and in mechanical connection with the pin or other member, wherein movement of the pin or other member under pressure by the operator causes the hood to be secured to the vehicle and the electric switch to send a signal to the vehicle.

The present general inventive concept, in another example embodiment, provides a pin or other member, at least indirectly attached to the vehicle hood, which moves under pressure by an operator, at least one electric switch, at least indirectly attached to the vehicle, to communicate signals to the vehicle, and in mechanical connection with the pin or other member; an outer housing with at least two holes to accept a cotter pin or other self-locking device, at least one hole on the pin or other member that can mate with the holes on the outer housing, wherein the electric switch is attached to the housing to communicate signals to the vehicle, and is in mechanical connection with the pin or other member, and wherein mating the holes in the pin or other member with the holes in the outer housing and inserting the cotter pin or other self-locking device into the mated holes causes the hood to be secured to the vehicle, and the electric switch to send a signal to the vehicle.

BRIEF DESCRIPTION OF THE SEVERAL VIEWS OF THE DRAWINGS

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION OF THE INVENTION

Figure 1:
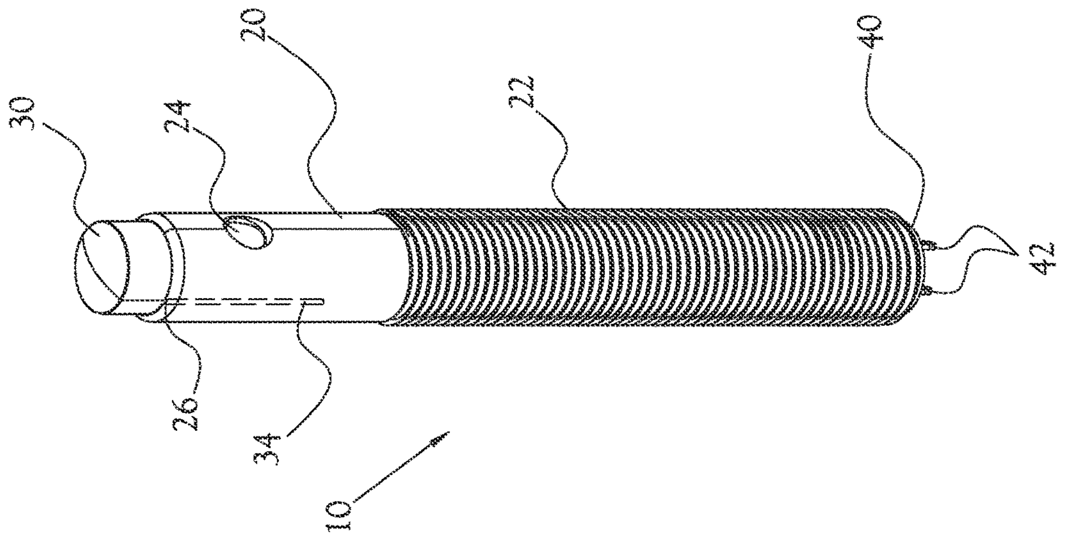
FIG. 1 is a perspective view showing one embodiment of a hood pin with interrupter switch constructed in accordance with several features of the present general inventive concept.

Reference will now be made to the example embodiments of the present general inventive concept, examples of which are illustrated in the accompanying drawings and illustrations. The example embodiments are described herein in order to explain the present general inventive concept by referring to the figures. The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be omitted for increased clarity and conciseness.

Note that spatially relative terms, such as “up,” “down,” “right,” “left,” “beneath,” “below,” “lower,” “above,” “upper” and the like, may be used herein for ease of description to describe one element or feature’s relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as “below” or “beneath” other elements or features would then be oriented “above” the other elements or features. Thus, the exemplary term “below” can encompass both an orientation of above and below. The device may be otherwise oriented (rotated 90 degrees or at other orientations) and the spatially relative descriptors used herein interpreted accordingly.

According to various example embodiments constructed in accordance with the present general inventive concept, a hood pin mechanism with a switch, such as for example an interrupter switch or other switch, is disclosed. The example embodiments described herein are described with reference to a hood pin mechanism, of the type having a low voltage ignition interrupter switch integrated in the pin housing. However, those skilled in the art will recognize that the present general inventive concept may be implemented using other types of switch devices, such as for example switches to activate one or more lights, noise signal devices, or other such devices. Furthermore, those skilled in the art will recognize that the present general inventive concept may be implemented using other types of interrupter switches other than ignition interrupter switches. For example, in other embodiments, a hood pin may be provided having an interrupter switch integrated therein which is configured to lockout various functions of the vehicle electronics, transmission, accelerator, or the like.

With reference to FIG. 1, in one embodiment, hood pin mechanism with integrated interrupter switch 10 is illustrated. A substantially cylindrical, hollow outer housing 20 is shown which, in the illustrated embodiment, defines threads 22 along an outer surface of a distal end thereof. A pair of nuts may be threaded onto the threads 22, in order to provide attachment means for the hood pin mechanism 10 to a bracket or other suitable surface inside the engine compartment of a vehicle. Other means for attaching the hood pin mechanism 10 to the inside of the engine compartment of a vehicle, e.g., welding, are known to those skilled in the art. Two housing holes 24 are located along the outer housing 20, which are diametrically opposed and axially aligned to each other and proximate to the end opposite from the threads 22. Also defined in the outer housing 20 is an elongated housing indention 26. The housing indention 26 is located on an inner surface of the outer housing 20 at an end proximate to the housing holes 24 and extends generally along a portion of the interior wall of the outer housing 20 in an axial dimension of the outer housing 20. In various embodiments, such as the illustrated embodiment, the housing indention 26 may be in the shape of a semicircle in its cross section or other shapes which will be readily apparent to one of skill in the art.

As will be described in further detail below, an inner hood pin 30 is provided defining a generally cylindrical outer surface. More specifically, the inner hood pin 30 is sized and shaped to correspond generally to the inner surface of the outer housing 20, and the inner hood pin 30 is telescopically received within the outer housing 20, such that an upper end of the inner hood pin 30 protrudes from the end of the outer housing 20 proximate to the housing holes 24. The inner hood pin 30 rests inside the outer housing 20 and is coaxial with the outer housing 20. As will be described in detail below, the inner hood pin 30 moves telescopically in an axial direction relative to the outer housing 20. Also shown in FIG. 1, at the opposite end from the housing holes 24, is an interrupter switch 40. The interrupter switch may contain electrical contacts 42, with a direct wired connection to the ignition, in order to transmit an electrical signal, for example to the ignition, to a signaling device, or the like. Other means of relaying the signal are known in the art, e.g., wireless signal means. In various embodiments, the interrupter switch 40 is generally secured relative to the outer housing 20 and may be attached to the outer housing 20, for example by a threaded connection, adhesive, frictional connection, or other means known to one of skill in the art.

Figure 2:
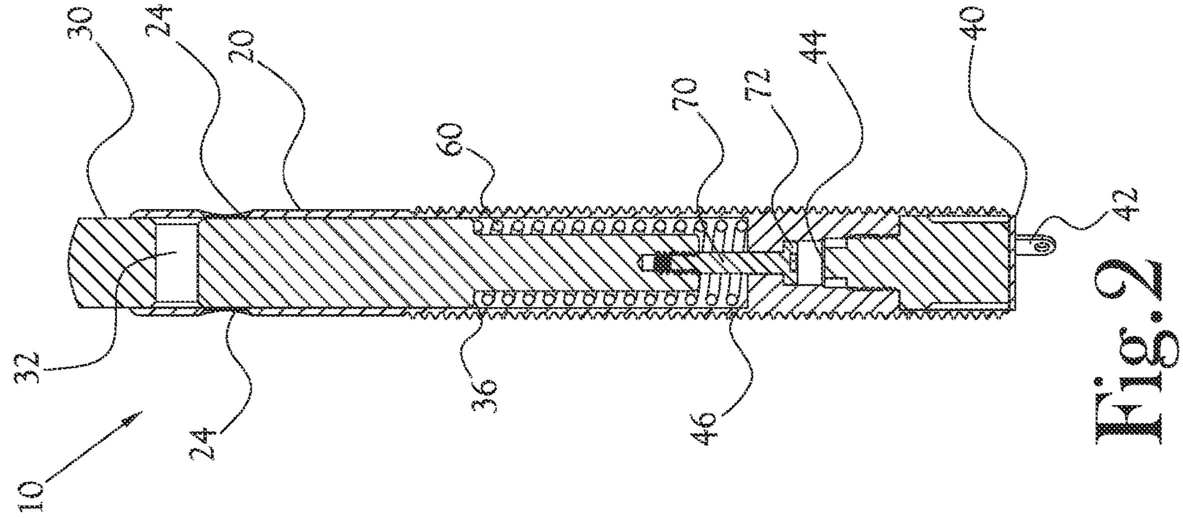
FIG. 2 is a cross-sectional view of the hood pin of FIG. 1.
Figure 3:
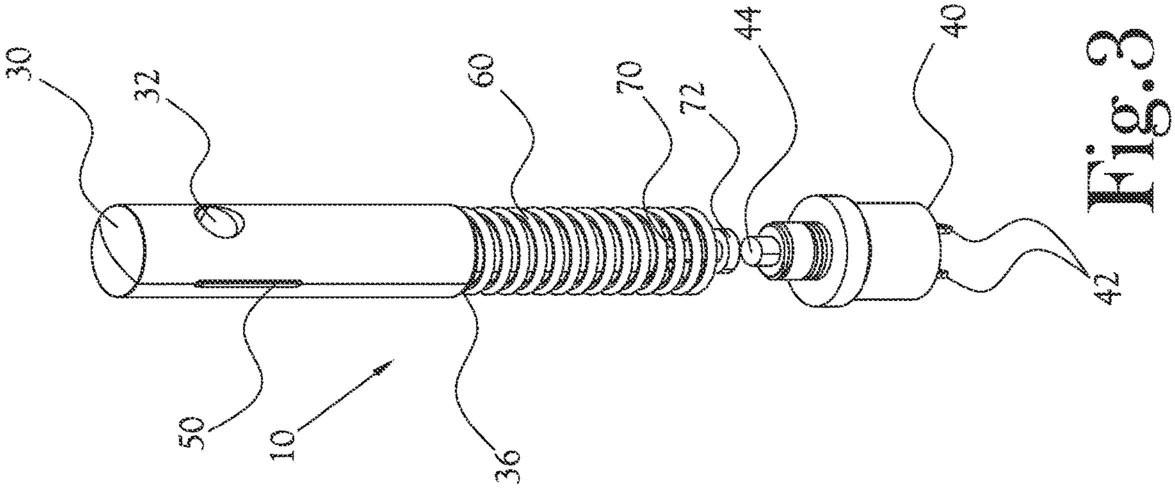
FIG. 3 is a perspective view of portions of the hood pin of FIG. 1, and specifically, showing the inner hood pin with the outer housing removed.

Shown in FIG. 2 is a cross-sectional view of the hood pin mechanism 10 of FIG. 1. The length of the inner hood pin 30 is shown resting inside the outer housing 20 and coaxial with the outer housing 20. A through hole 32 is defined by an end of the inner hood pin 30 proximate the housing holes 24. The through hole 32 is generally a similar size as the housing holes 24 and is intended to align with the housing holes 24 during operation of the hood pin mechanism 10, as described below. Also located on the inner hood pin 30 is a hood pin indention 34. In the illustrated embodiment, the hood pin indention 34 is generally a similar size and shape as the housing indention 26 and extends axially along the outer surface of the inner hood pin 30 in underlying relationship to the housing indentation 26. With reference to FIG. 3, shown resting inside the hood pin indention 34 is a roll pin 50. The roll pin 50 has generally a cross-sectional shape corresponding to that of both the hood pin indention 34 and the housing indention 26. It will be recognized that, in various embodiments, the roll pin 50 may be a separate component or may be integral with either the outer housing 20 or the inner hood pin 30. By resting matingly inside both the hood pin indention 34 and the housing indention 26, the roll pin 50 permits movement of the inner hood pin 30 in an axial direction relative to the outer housing 20, while limiting relative movement of the inner hood pin 30 and the outer housing 20 in a circumferential or “twisting” direction. With the circumferential distance between each of the indentions, 34 and 26, and their corresponding holes, 32 and 24, substantially the same, and the roll pin 50 resting matingly inside the hood pin indention 34 and the housing indention 26, the holes 32 and 24 are held in alignment with one another along a circumferential dimension of the outer housing 20 and inner hood pin 30. Thus, the inner hood pin 30 may be telescopically extended from within the outer housing 20 to misalign the through hole 32 from the housing holes 24. Conversely, the inner hood pin 30 may be telescopically received into the outer housing 20 to align the through hole 32 with the housing holes 24 along respective axial dimensions of the respective holes 32 and 24.

Those skilled in the art will recognize numerous additional mechanisms and configurations by which the inner hood pin 30 may be permitted to move in an axial direction relative to the outer housing 20, while resisting or otherwise limiting relative movement of the inner hood pin 30 and the outer housing 20 in a circumferential direction; and such additional mechanisms and configurations may be employed without departing from the spirit and scope of the present general inventive concept. For example, in other embodiments (not shown), this relative movement of the inner hood pin 30 and outer housing 20 may be achieved, for example, via corresponding parallel flat areas defined along the inner hood pin 30 and outer housing 20, via provision of a slot and corresponding pin, or via a hex-shaped, square-shaped, or other appropriately shaped inner hood pin 30 received within a correspondingly-shaped opening defined by the outer housing 20. Additional suitable mechanisms and configurations will be understood and recognized by one of skill in the art.

Shown in FIGS. 2 and 3 is a compression spring 60. The compression spring 60 rests inside the outer housing 20 and is intended to bias the inner hood pin 30 in an axially upward direction, toward an "extended" position telescopically outwardly from the outer housing 20. In the illustrated embodiment, one end of the compression spring 60 rests against an inner hood pin shelf 36 defined proximate a lower end of the inner hood pin 30, and the opposite end of the compression spring 60 rests against an outer housing shelf 46 defined along a lower portion of the inner surface of the outer housing 20. However, those of skill in the art will recognize numerous configurations and devices which may be used to bias the inner hood pin 30 toward the above-discussed "extended" position, and such devices and configurations may be used without departing from the spirit and scope of the present general inventive concept.

Also shown in FIG. 2 is an actuator bolt 70 and the above-discussed interrupter switch 40. The actuator bolt 70 is received within an at-least partially internally-threaded bore at the bottom of the inner hood pin 30 and extends downward from, and coaxial to, the inner hood pin 30. The hole at the bottom of the inner hood pin 30 and the top portion of the actuator bolt 70, are shown with mating female and male threads, respectively, along partial lengths thereof. This provides for a secure connection when the actuator bolt 70 is fully threaded into the hole at the bottom of the inner hood pin 30, but also provides some adjustments in the axial direction between the inner hood pin 30 and actuator bolt 70. In other embodiments, the inner hood pin 30 could be integral with the actuator bolt 70, and in still other embodiments, other means of securing the inner hood pin 30 with the actuator bolt 70 may be used. The outer housing shelf 46 defines an annular through opening through which the actuator bolt 70 is received. This assists in maintaining the actuator bolt in coaxial alignment with the outer housing 20 and the inner hood pin 30. The lower end of the actuator bolt 70 defines an anvil 72 that extends radially outwardly from the actuator bolt 70 and engages a lower surface of the outer housing shelf 46 when the inner hood pin 30 is in the "extended" position. This limits axial movement of the inner hood pin 30 in relation to the outer housing 20 to a range of movement between the "extended" position, in which the inner hood pin 30 is telescopically extended from within the outer housing 20, thereby misaligning the through hole 32 from the housing holes 24; and the "depressed" position, in which the inner hood pin 30 is telescopically received within the outer housing 20, thereby aligning the through hole 32 with the housing holes 24.

In the illustrated embodiment, the interrupter switch 40 defines a cylindrical, threaded outer surface and is received within an interiorly-threaded cavity defined in a lower end of the outer housing 20. Electrical contacts 42 extend from beneath a lower end of the outer housing 20 and a switch button 44 extends generally upwardly, along a central axis of the inner hood pin 30, coaxial with the actuator bolt 70. In the illustrated embodiment, depression of the switch button 44 causes a voltage to form between the electrical contacts 42 and current to flow, sending an electric signal. Similarly, releasing the switch button 44 stops the signal. In this configuration, manual pressure by an operator on the upper portion of the inner hood pin 30 will cause the inner hood pin 30 to move toward the "depressed" position, telescopically inward from the outer housing 20, causing the through hole 32 and housing holes 24 to align, the actuator bolt 70 to move in an axially inward position, and the anvil 72 to depress the switch button 44, thereby sending the above-discussed electric signal indicating that the hood pin 10 has been moved toward the "depressed" position.

FIG. 3 shows the hood pin mechanism 10 with the outer housing 20 removed. The roll pin 50 is shown resting ma tingly inside the hood pin indention 34. One side of the compression spring 60 is resting against the inner hood pin shelf 36 while the opposite side of the compression spring 60 is free and is in an unloaded position. The interrupter switch 40 is shown with the switch button 44 not depressed.

Operation of the hood pin mechanism 10, in one embodiment, can be described as follows, with reference to FIGS. 1-4. One or more hood pin mechanisms 10, are attached to a bracket or other suitable surface inside an engine compartment of a vehicle 100 with the inner hood pin 30 facing upwards. One or more holes in the hood 80 of the vehicle 100 align with the hood pin mechanism 10 allowing the hood pin mechanism 10 to protrude through the holes in the hood 80 as the hood 80 is being closed. With the hood 80 closed firmly, the operator may depress the inner hood pin 30 until the hood pin hole 32 aligns with the housing holes 24. At this point, the operator may insert a pin 90 through the hood pin holes 32 and housing holes 24 to secure the hood 80 in place. In this position, the switch button 44 of the interrupter switch 40 will remain depressed and the device will be in "latched" position. This process can be repeated where more than one hood pin mechanism 10 is being utilized and the vehicle may be wired such that all hood pin mechanisms have to be in "latched" position for the vehicle to start. In other embodiments, the vehicle may be wired such that, if any hood pin is not in the "latched" position, a signal is emitted, such as for example a light, buzzer, or the like. In still other positions, the vehicle may be wired such that, if any hood pin is not in the "latched" position, another device of the vehicle, such as for example the transmission shifter or other devices, will not function.

Figure 5:
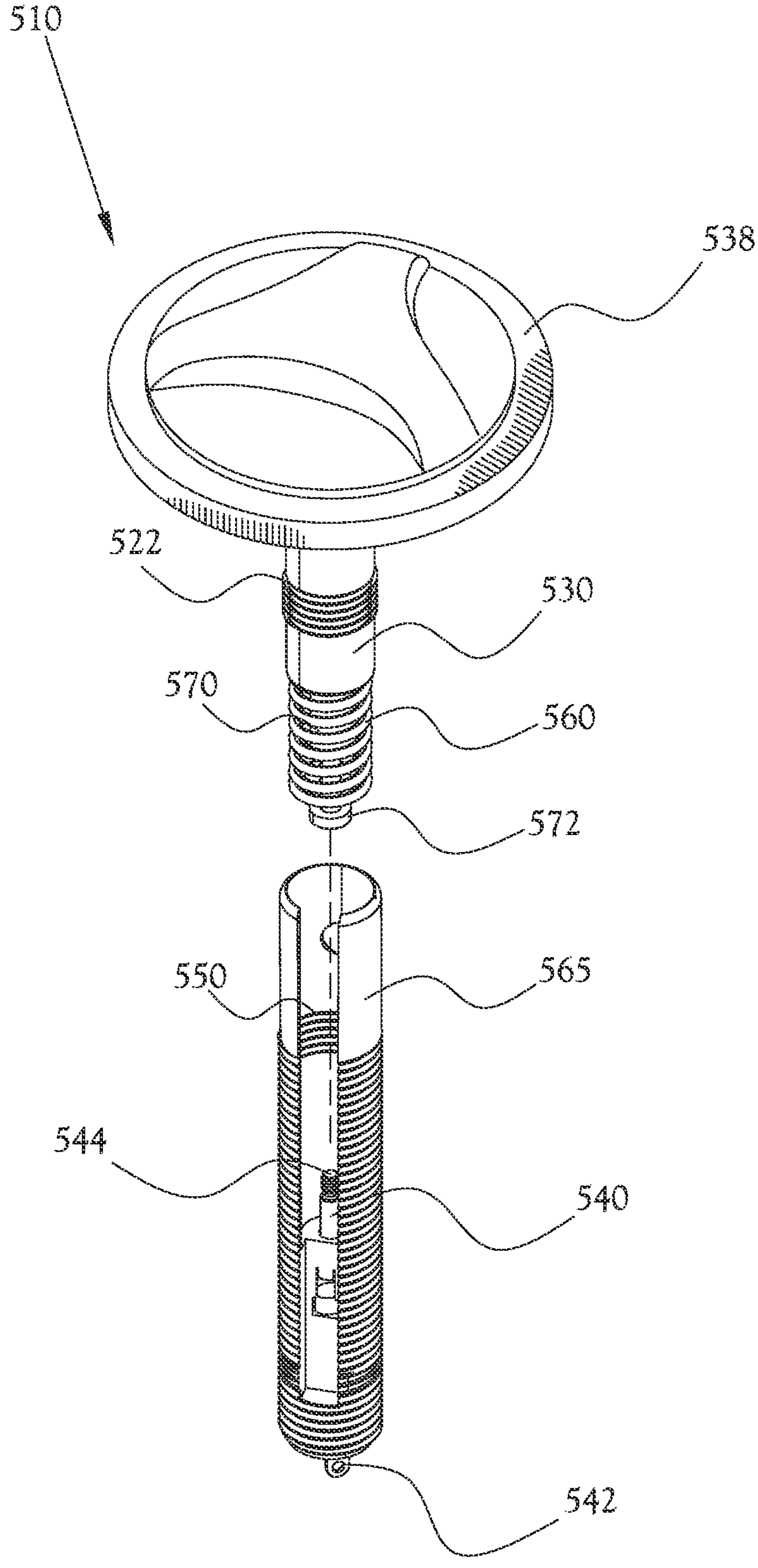
FIG. 5 is a perspective view of another embodiment of a hood pin mechanism constructed in accordance with several features of the present general inventive concept.

Another embodiment constructed in accordance with the present general inventive concept is illustrated in FIG. 5. Here, a twist-style hood pin mechanism 510 is provided which includes an inner hood pin 530 having a proximal end and a distal end, with a pin head 538 generally affixed to or incorporated into the proximal end, and an actuator bolt 570 with actuator bolt head 572 affixed to or located on the distal end. The twist-style hood pin mechanism 510 also generally includes threads, grooves, or other suitable rotatable fastener mechanisms 522 along an outer surface of the inner hood pin 530 to allow the inner hood pin 530 to be received within an outer housing (not shown) and rotatably secured in the “depressed” position within the outer housing. For example, in the illustrated embodiment, the inner hood pin 530 defines a series of threads 522 along a portion of the outer surface thereof. The threads are sized and shaped to threadably mate with and engage corresponding threads 550 defined along at least a portion of an interior surface of the outer housing 565 when the inner hood pin 530 is received within the outer housing in the “depressed” position.

In operation, the outer housing 565 portion of the twist-style hood pin mechanism 510 is attached to a vehicle body as described above. When the twist-style hood pin mechanism 510 is received within the outer housing 565, the threads 522 on the inner hood pin 530 work cooperatively with the corresponding threads 550 within the outer housing, thereby securing the twist-style hood pin mechanism 510 to the vehicle. When the twist-style hood pin mechanism 510 is thereby secured in place, the actuator bolt head 572 makes contact with the switch button 544 attached to the interrupter switch 540, located within the outer housing. As with other embodiments described herein, the default position of the inner hood pin 530 is the “non-signal” position with the switch button 544 not depressed. Insertion and securement of the inner hood pin 530 within the outer housing 565 causes the actuator bolt 570 to be positioned toward the switch button 544 until the actuator bolt head 572 to depresses the switch button 544. Depression of the switch button 544 causes a voltage to form between electrical contacts 542 within the interrupter switch 540 and current to flow, sending an electric signal. Similarly, removal of the inner hood pin 530 from within the outer housing 565 causes the switch button 544 to be released, thereby stopping the signal.

Figure 6:
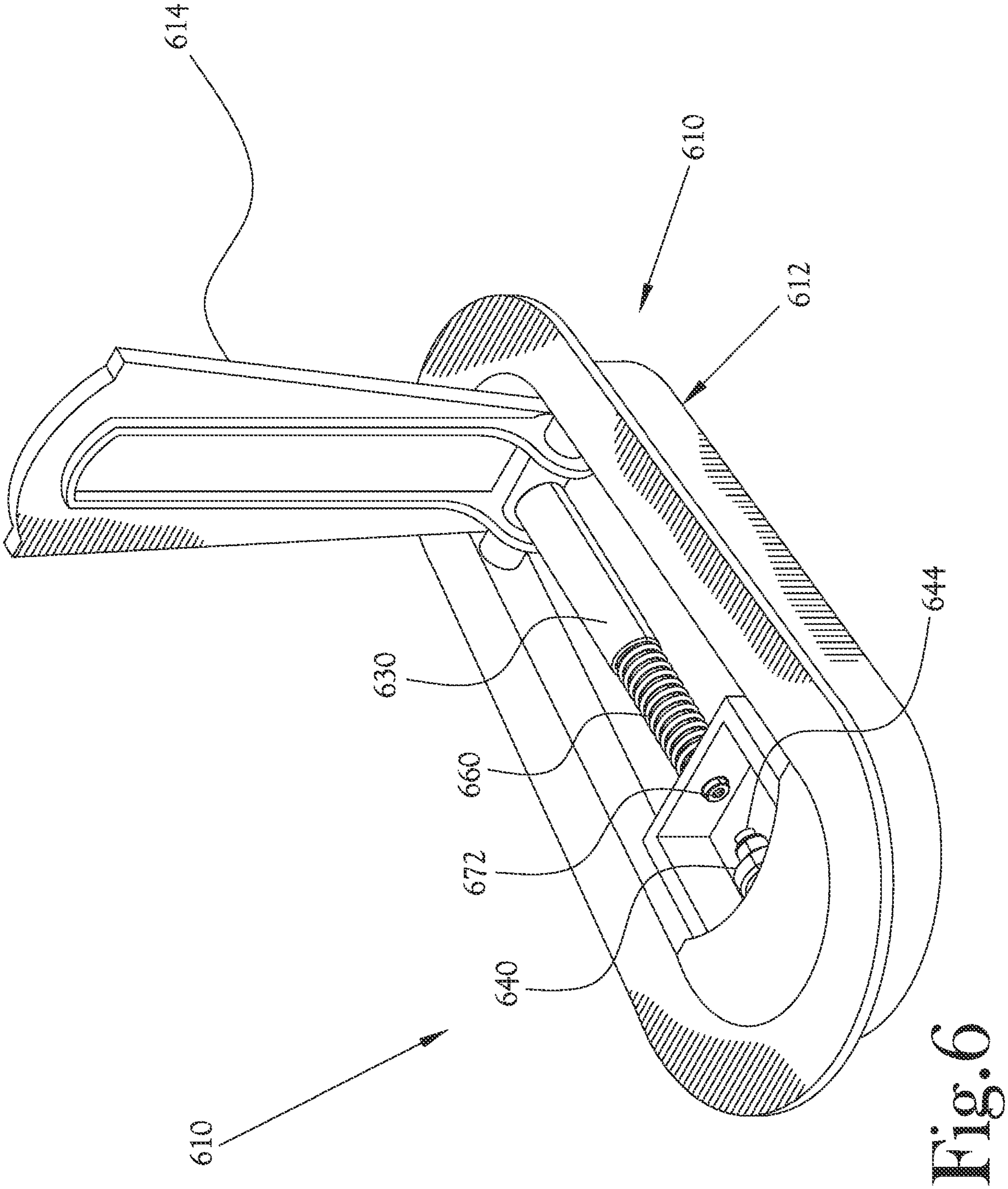
FIG. 6 is a perspective view of another embodiment of a hood pin mechanism constructed in accordance with several features of the present general inventive concept.

Another embodiment constructed in accordance with several features of the present general inventive concept is illustrated generally in FIG. 6. Here, a latch-style hood pin mechanism 610 includes an inner hood pin 630 situated within a latch housing 612. The inner hood pin 630 is operably connected to a latch 614 that moves between an open position (shown in FIG. 6) and a closed position. Similar to the above-discussed embodiments, the inner hood pin 630 includes a compression spring 660 which is configured to bias the inner hood pin 630, and thus also the latch 614, toward the open position. The inner hood pin 630 further includes an actuator bolt and an actuator head 672. The latch-style hood pin mechanism 610 further includes an interrupter switch 640 positioned within the latch housing 612, with a switch button 644 thereof positioned in axial alignment with the When, as illustrated in FIG. 6, the latch 614 and associated inner hood pin 630 are in the open position, the actuator head 672 is drawn away from the actuator bolt and an actuator head 672.

In operation, when the latch 614 is moved from the illustrated open position to the closed position, the movement of the latch 614 drives the inner hood pin 630 such that the actuator head 672 is brought into contact with a switch button 644 attached to an interrupter switch 640. Additionally, when the latch 614 is moved from an open position to a closed position, the movement of the latch 614 causes a hook or other locking device (not shown) to engage with a rod or other device attached to the vehicle body, thereby securing the hood to the vehicle body. As with other embodiments described herein, the default position of the inner hood pin 630 is the “non-signal” position with the switch button 644 not depressed; this is the case when the latch 614 is in its open position, and the compression spring 660 assists in this function by resisting movement of the inner hood pin 630 toward the interrupter switch 640 and switch button 644. Pressure by an operator on the inner hood pin 630 causes the actuator head 672 to move and to depress the switch button 644. Depression of the switch button 644 causes a voltage to form within the interrupter switch 640 and current to flow, sending an electric signal. Similarly, releasing the switch button 644 stops the signal.

Figure 7:
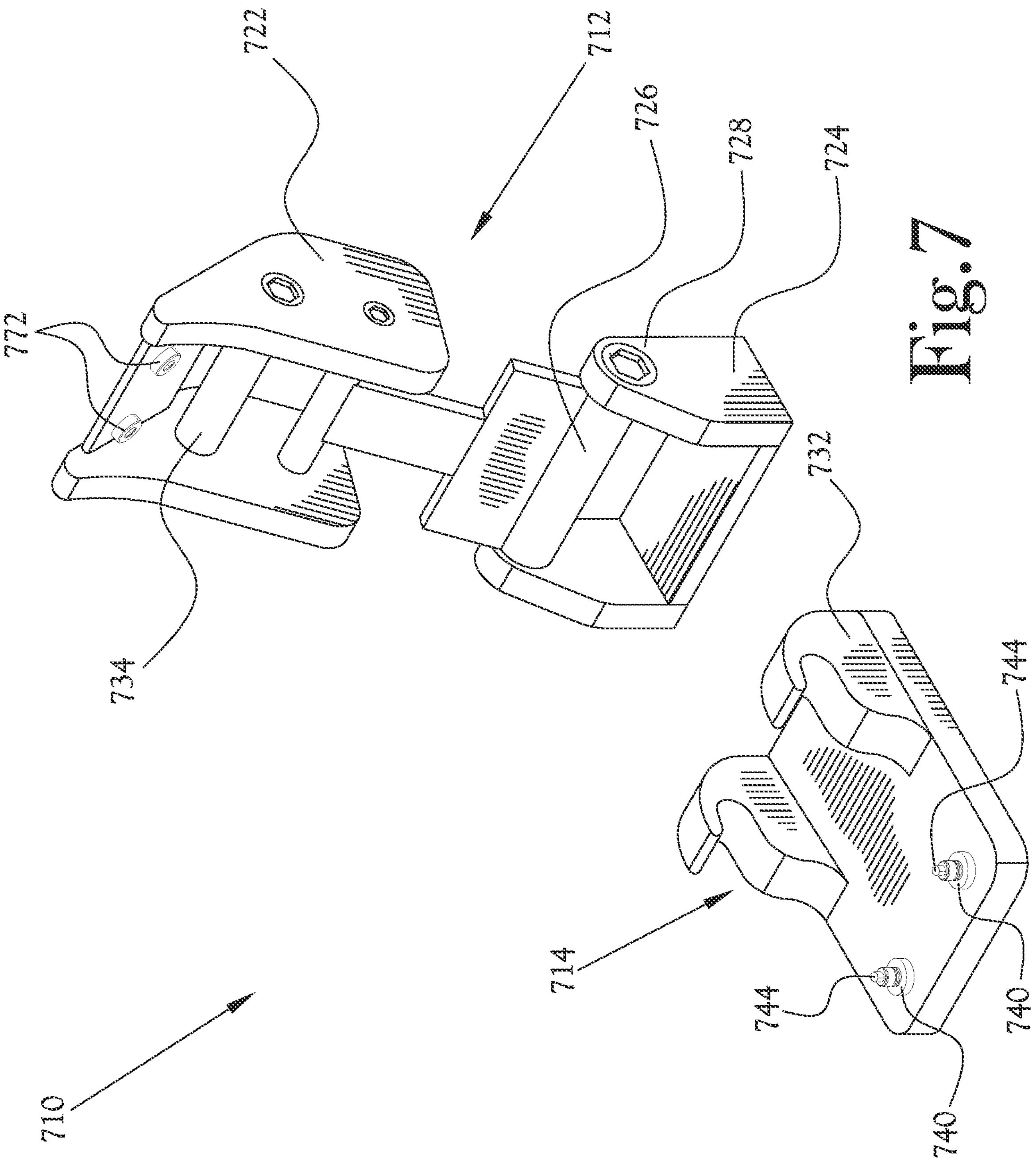
FIG. 7 is a perspective view of another embodiment of a hood pin mechanism constructed in accordance with several features of the present general inventive concept.

Another embodiment constructed in accordance with several features of the present general inventive concept is illustrated generally in FIG. 7. Here, an external-style hood pin mechanism 710 includes a latch member assembly 712 and a receiver member 714 configured to engage with a latch member 722 of the latch member assembly 712. The latch member assembly 712 includes, in addition to the latch member 722, a base member 724, which generally is affixed to a vehicle body, while the separate receiver member 714 generally is affixed to a vehicle hood. The latch member 722 moves with respect to the base member 724 about an axle 728 that engages with both the base member 724 and a connecting member 726 that joins with the latch member 722. The latch member 722 includes at least one rod 734 that engages with one or more hook components 732 on the receiver member 714. When the latch member 722 engages with the receiver member 714, the hood is thereby secured to the vehicle body. In the illustrated example embodiment, the external-style hood pin mechanism 710 includes actuator heads 772 on the latch member 722 and a pair of interrupter switches 740 with switch heads 744 on the receiver member 714.

In operation, when the latch member 722 is moved from an open position to a closed position, the movement of the latch member 722 moves the actuator heads 772 so that the actuator heads 772 are brought into contact with corresponding switch buttons 744 attached to interrupter switches 740. Depression of the switch buttons 744 causes a voltage to form within the interrupter switches 740 and current to flow, sending an electric signal. Similarly, releasing the switch buttons 744 stops the signal. In the illustrated embodiment, a pair of interrupter switches 740 with switch heads 744 is provided, however, it will be recognized that any number of interrupter switches 740 with corresponding switch heads 744 may be provided without departing from the spirit and scope of the present general inventive concept.

Figure 4:
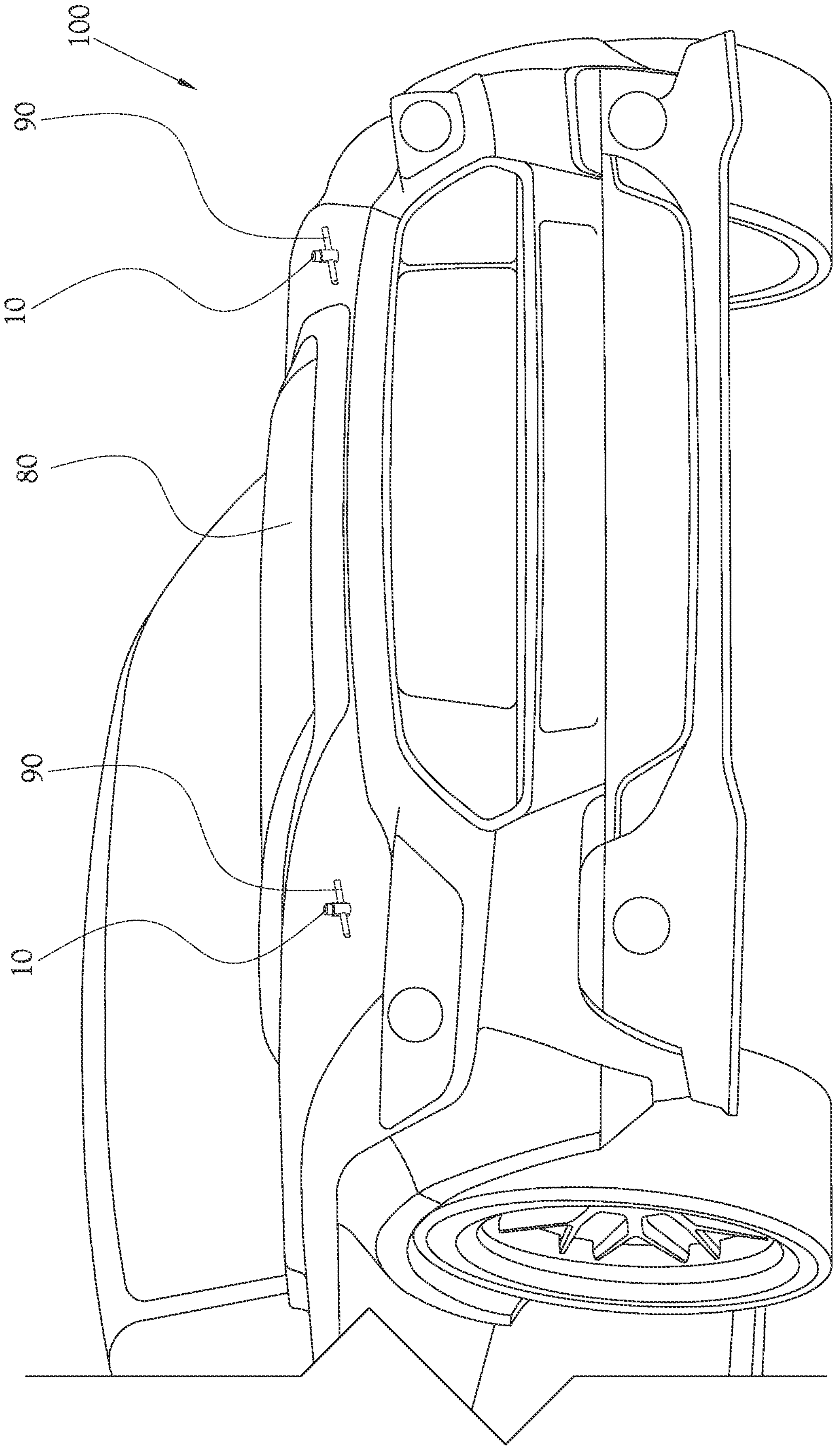
FIG. 4 is a perspective view of a portion of a vehicle with two hood pins constructed in accordance with several features of the present general inventive concept installed in the hood of the vehicle.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein. Numerous variations, modification, and additional embodiments are possible, and, accordingly, all such variations, modifications, and embodiments are to be regarded as being within the spirit and scope of the present general inventive concept. For example, while FIG. 4 illustrates the hood pin mechanism 10 mounted to a core support of the vehicle and protruding through an opening on the vehicle hood, it will be understood that this configuration could be reversed. In other words, in various embodiments, the hood pin mechanism 10 may be mounted to the hood and may protrude downward into the engine compartment, such that lowering of the hood positions the hood pin for depression of the hood pin mechanism. In this regard, while the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

Having thus described the aforementioned invention, what is claimed is:

1. An apparatus for securing a vehicle hood to a vehicle, the apparatus comprising:

an elongated pin defining a longitudinal direction along a length thereof;

a latch attached to one end of the pin that moves between an open position and a closed position;

a latch housing surrounding the pin and the latch, the latch and the latch housing cooperating to encase the pin when the latch is in the closed position, wherein movement of the latch between the open position and the closed position advances and withdraws the pin along the longitudinal direction within the latch housing;

a compression spring attached to the pin that biases the latch toward the open position; and an actuator head attached to the pin;

wherein movement of the latch into the closed position from the open position causes the vehicle hood to be secured to the vehicle body; and wherein movement of the latch into the closed position from the open position causes the pin to advance along the longitudinal direction to cause the actuator head to engage an electric switch and the electric switch to send a signal to the vehicle.

2. The apparatus of claim 1, wherein the signal sent from the electric switch communicates with an ignition interrupter switch.

3. The apparatus of claim 1, wherein the signal sent from the electric switch communicates with a transmission or accelerator of the vehicle.

4. The apparatus of claim 1, wherein the signal sent from the electric switch activates or deactivates one or more signaling devices.

5. The apparatus of claim 4, wherein the one or more signaling devices comprises a light.

6. The apparatus of claim 5, wherein the one or more signaling devices further comprises a noise signal device.

7. The apparatus of claim 1, wherein the signal sent from the electric switch is configured to lockout a function of the vehicle selected from the group consisting of a vehicle electronic, a vehicle transmission, and a vehicle accelerator.

* * * * *